US008010407B1

(12) United States Patent
Santoro et al.

(10) Patent No.: US 8,010,407 B1
(45) Date of Patent: Aug. 30, 2011

(54) BUSINESS FINDER FOR LOCATING LOCAL BUSINESSES TO CONTACT

(75) Inventors: David Santoro, Menlo Park, CA (US); David S. Young, Mountain View, CA (US); John Callaway, Mountain View, CA (US); Osi Imeokparia, Brooklyn, NY (US); Gregory Joseph Badros, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 795 days.

(21) Appl. No.: 11/940,181

(22) Filed: Nov. 14, 2007

Related U.S. Application Data

(60) Provisional application No. 60/865,804, filed on Nov. 14, 2006.

(51) Int. Cl.
*G06Q 30/00* (2006.01)
(52) U.S. Cl. ..................... 705/14.49; 705/14.4
(58) Field of Classification Search .............. 705/14.4, 705/14.49
See application file for complete search history.

(56) References Cited

U.S. PATENT DOCUMENTS

| | | |
|---|---|---|
| 4,972,319 A | 11/1990 | DeLorme |
| 5,051,928 A | 9/1991 | Gruters |
| 5,559,707 A | 9/1996 | DeLorme et al. |
| 5,613,051 A | 3/1997 | Iodice et al. |
| 5,646,751 A | 7/1997 | Motamed et al. |
| 5,724,521 A | 3/1998 | Dedrick |
| 5,737,533 A | 4/1998 | de Hond |
| 5,740,549 A | 4/1998 | Reilly et al. |
| 5,760,783 A | 6/1998 | Midgal et al. |
| 5,802,492 A | 9/1998 | DeLorme et al. |
| 5,848,373 A | 12/1998 | DeLorme et al. |
| 5,848,397 A | 12/1998 | Marsh et al. |
| 5,910,805 A | 6/1999 | Hickey et al. |
| 5,948,061 A | 9/1999 | Merriman |
| 6,002,809 A | 12/1999 | Feig |
| 6,026,368 A | 2/2000 | Brown et al. |
| 6,031,963 A | 2/2000 | Kitamura et al. |
| 6,044,376 A | 3/2000 | Kurtzman, II |
| 6,054,990 A | 4/2000 | Tran |

(Continued)

FOREIGN PATENT DOCUMENTS

JP 61-135270 A 6/1986

(Continued)

OTHER PUBLICATIONS

Second Office Action of China State Intellectual Property Office, Chinese Patent Application No. 200580013512.0, Oct. 23, 2009, 8 pages.

(Continued)

*Primary Examiner* — Jagdish N Patel
*Assistant Examiner* — Kenneth Bartley
(74) *Attorney, Agent, or Firm* — Fenwick & West LLP

(57) ABSTRACT

Marketing techniques are disclosed that allow companies to efficiently identify target businesses to solicit for purchase of advertising products. One embodiment includes a map-based interface for selecting a neighborhood and locating any businesses known to a company selling advertising products in that area, with the intent of allowing a company representative to select a set of those businesses to contact regarding the company's advertising products. The map displays business listings as markers on the map, with color-coding used to indicate listings the representative has already contacted, and listings that some other representative has contacted.

25 Claims, 2 Drawing Sheets

U.S. PATENT DOCUMENTS

| | | | |
|---|---|---|---|
| 6,078,914 | A | 6/2000 | Redfern |
| 6,098,015 | A | 8/2000 | Nimura et al. |
| 6,144,944 | A | 11/2000 | Kurtzman, II et al. |
| 6,167,382 | A | 12/2000 | Sparks et al. |
| 6,182,010 | B1 | 1/2001 | Berstis |
| 6,199,014 | B1 | 3/2001 | Walker et al. |
| 6,208,934 | B1 | 3/2001 | Bechtolsheim et al. |
| 6,252,608 | B1 | 6/2001 | Snyder et al. |
| 6,262,741 | B1 | 7/2001 | Davies |
| 6,266,614 | B1 | 7/2001 | Alumbaugh |
| 6,269,361 | B1 | 7/2001 | Davis et al. |
| 6,278,938 | B1 | 8/2001 | Alumbaugh |
| 6,321,158 | B1* | 11/2001 | DeLorme et al. ............ 701/201 |
| 6,401,075 | B1 | 6/2002 | Mason et al. |
| 6,421,053 | B1 | 7/2002 | Johns et al. |
| 6,538,656 | B1 | 3/2003 | Cheung et al. |
| 6,573,905 | B1 | 6/2003 | MacInnis et al. |
| 6,826,472 | B1 | 11/2004 | Kamei et al. |
| 6,985,882 | B1 | 1/2006 | Del Sesto |
| 7,039,599 | B2 | 5/2006 | Merriman |
| 7,054,741 | B2* | 5/2006 | Harrison et al. ............ 701/208 |
| 7,136,875 | B2 | 11/2006 | Anderson et al. |
| 7,136,915 | B2* | 11/2006 | Rieger, III ............ 709/223 |
| 7,210,119 | B2* | 4/2007 | Pothos et al. ............ 717/102 |
| 7,260,474 | B1 | 8/2007 | Thayathil et al. |
| 7,353,034 | B2* | 4/2008 | Haney ............ 455/457 |
| 7,373,244 | B2* | 5/2008 | Kreft ............ 701/207 |
| 7,451,041 | B2* | 11/2008 | Laumeyer et al. ............ 701/209 |
| 7,580,045 | B2* | 8/2009 | Harrison et al. ............ 345/628 |
| 7,617,296 | B2* | 11/2009 | Bank ............ 709/217 |
| 2001/0034661 | A1 | 10/2001 | Ferreira |
| 2001/0044837 | A1 | 11/2001 | Talib et al. |
| 2002/0002478 | A1* | 1/2002 | Swart et al. ............ 705/8 |
| 2002/0067353 | A1* | 6/2002 | Kenyon et al. ............ 345/419 |
| 2002/0095328 | A1* | 7/2002 | Swart et al. ............ 705/10 |
| 2002/0099613 | A1* | 7/2002 | Swart et al. ............ 705/26 |
| 2002/0159657 | A1 | 10/2002 | DeLorme |
| 2003/0041087 | A1* | 2/2003 | Pothos et al. ............ 709/102 |
| 2003/0050065 | A1* | 3/2003 | Alletson et al. ............ 455/445 |
| 2003/0061211 | A1* | 3/2003 | Shultz et al. ............ 707/3 |
| 2003/0078897 | A1* | 4/2003 | Florance et al. ............ 705/80 |
| 2003/0182052 | A1* | 9/2003 | DeLorme et al. ............ 701/201 |
| 2004/0128215 | A1* | 7/2004 | Florance et al. ............ 705/28 |
| 2004/0153434 | A1 | 8/2004 | Cogen et al. |
| 2005/0065856 | A1 | 3/2005 | Roberts et al. |
| 2005/0131634 | A1 | 6/2005 | Ignatin |
| 2005/0171686 | A1 | 8/2005 | Davis |
| 2005/0216287 | A1 | 9/2005 | Crosby et al. |
| 2005/0216448 | A1 | 9/2005 | Talib et al. |
| 2005/0246487 | A1 | 11/2005 | Ergan et al. |
| 2005/0246627 | A1 | 11/2005 | Sayed |
| 2005/0270299 | A1* | 12/2005 | Rasmussen et al. ............ 345/552 |
| 2005/0270311 | A1* | 12/2005 | Rasmussen et al. ............ 345/677 |
| 2006/0123053 | A1 | 6/2006 | Scannell |
| 2006/0173841 | A1 | 8/2006 | Bill |
| 2006/0200383 | A1* | 9/2006 | Arutunian et al. ............ 705/14 |
| 2006/0241859 | A1* | 10/2006 | Kimchi et al. ............ 701/208 |
| 2007/0010942 | A1 | 1/2007 | Bill |
| 2007/0022007 | A1 | 1/2007 | Lawe |
| 2007/0050340 | A1* | 3/2007 | von Kaenel et al. ............ 707/3 |
| 2007/0073583 | A1 | 3/2007 | Grouf et al. |
| 2007/0073584 | A1 | 3/2007 | Grouf et al. |
| 2007/0100801 | A1* | 5/2007 | Celik et al. ............ 707/3 |
| 2007/0100802 | A1* | 5/2007 | Celik ............ 707/3 |
| 2007/0100867 | A1* | 5/2007 | Celik et al. ............ 707/102 |
| 2007/0106468 | A1* | 5/2007 | Eichenbaum et al. ........ 701/211 |
| 2007/0156524 | A1 | 7/2007 | Grouf et al. |
| 2007/0156525 | A1 | 7/2007 | Grouf et al. |
| 2007/0179867 | A1 | 8/2007 | Glazer et al. |
| 2007/0192189 | A1* | 8/2007 | Popowich et al. ............ 705/14 |
| 2007/0203643 | A1 | 8/2007 | Ramaswamy et al. |
| 2007/0239348 | A1 | 10/2007 | Cheung |
| 2007/0244753 | A1 | 10/2007 | Grouf et al. |
| 2007/0265858 | A1* | 11/2007 | Pansari et al. ............ 705/1 |
| 2008/0027642 | A1* | 1/2008 | Winberry et al. ............ 701/212 |
| 2008/0040212 | A1 | 2/2008 | Grouf et al. |
| 2008/0052150 | A1 | 2/2008 | Grouf et al. |
| 2008/0052151 | A1* | 2/2008 | Xie et al. ............ 705/14 |
| 2010/0185514 | A1 | 7/2010 | Glazer et al. |

FOREIGN PATENT DOCUMENTS

| | | |
|---|---|---|
| JP | 2000-029448 A | 1/2000 |
| JP | 2002-032280 A | 1/2002 |
| JP | 2003-208597 A | 7/2003 |
| WO | WO 97/21183 | 6/1997 |

OTHER PUBLICATIONS

First Office Action of China State Intellectual Property Office, Chinese Patent Application No. 200580013912.1, Aug. 28, 2009, 16 pages.

95/001,073, Reexamination of Stone et al.

95/001,061, Reexamination of Stone et al.

95/001,069, Reexamination of Dean et al.

95/001,068, Reexamination of Stone et al.

AdForce, Inc., A Complete Guide to AdForce, Version 2.6, 1998.

AdForce, Inc., S-1/A SEC Filing, May 6, 1999.

AdKnowledge Campaign Manager: Reviewer's Guide, AdKnowledge, Aug. 1998.

AdKnowledge Market Match Planner: Reviewer's Guide, AdKnowledge, May 1998.

Ad-Star.com website archive from www. Archive.org, Apr. 12, 1997 and Feb. 1, 1997.

Baseview Products, Inc., AdManagerPro Administration Manual v. 2.0, Dec. 1998.

Baseview Products, Inc., ClassManagerPro Administration Manual v. 1.0.5, Feb. 1, 1997.

Business Wire, "Global Network, Inc. Enters Into Agreement in Principle With Major Advertising Agency," Oct. 4, 1999.

Information Access Technologies, Inc., Aaddzz brochure, "The Best Way to Buy and Sell Web Advertising Space," © 1997.

Information Access Technologies, Inc., Aaddzz.com website archive from www. Archive.org, archived on Jan. 30, 1998.

Zeff, R. et al., Advertising on the Internet, 2nd Ed., John Wiley & Sons, 1999.

Dedrick, R., Interactive Electronic Advertising, IEEE, 1994.

Dedrick, R., A Consumption Model for Targeted Electronic Advertising, Intel Architecture Labs, IEEE, 1995.

Request for Reexamination of U.S. Patent No. 7,240,025 B2, Control No. 95/001,073.

Request for Reexamination of U.S. Patent No. 6,446,045 B1, Control No. 95/001,061.

Request for Reexamination of U.S. Patent No. 7,249,059 B2, Control No. 95/001,069.

Request for Reexamination of U.S. Patent No. 6,829,587 B2, Control No. 95/001,068.

Examination Report for European Patent Application No. EP 05729642.8, Oct. 8, 2010, 6 pages.

Second Office Action of China State Intellectual Property Office, Chinese Patent Application No. 200580013912.1, Nov. 22, 2010, 8 pages.

Notice of Grounds for Rejection, Japanese Patent Application No. P2007-505107, May 18, 2010, 6 Pages.

Supplementary European Search Report for European Patent Application No. EP05729642, May 12, 2010, 5 Pages.

Brenner, C., et al., "Extracting Landmarks for Car Navigation Systems Using Existing GIS Databases and Laser Scanning," ISPRS Archives, Sep. 2003, 6 Pages, vol. XXXIV, Part 3/W8.

Burnett, G.E., "'Turn right at the King's Head" Drivers' requirements for route guidance information," A Doctoral Thesis of Loughborough University, Nov. 1998, [online] [retrieved on Feb. 22, 2010], Retrieved from the internet <URL: http://dspace.mit.edu/handle/1721.1/14225>.

Burnett, G.E., "Turn right at the traffic lights" The requirement for landmarks in vehicle navigation systems, The Journal of Navigation, 2000, p. 499-5010, vol. 53 No. 3.

Davis, J.R., "The Back Seat Driver: Real Time Spoken Driving Instructions," IEEE, 1989, pp. 146-150.

Yamaichi, R., "We can see web business models of the Windows 2000 era! Backside of Exchange2000 (Café www.exchange2000j.com)", BackOffice World, Oct. 1, 2000, pp. 91-97 vol. 3, IDG Japan. (With English Summary).

"Paid Search" Webopedia, 2010, 1 page, can be retrieved online at <URL:www.webopedia.com/TERM/P/paid_search.html>.

* cited by examiner

BUSINESS FINDER FOR LOCATING LOCAL BUSINESSES TO CONTACT

RELATED APPLICATIONS

This application claims priority from U.S. Provisional Application No. 60/865,804 filed Nov. 14, 2006. This application is related to U.S. Application No. 60/865,809, filed Nov. 14, 2006, titled "Automatically Generating Personalized Mailers for Advertising Products." In addition, this application is related to U.S. application Ser. No. 11/051,534, filed Feb. 5, 2005, titled "A Digital Mapping System" and to U.S. application Ser. No. 11/088,542, filed Mar. 23, 2005, titled "Generating and Serving Tiles in a Digital Mapping System." All of the foregoing applications are incorporated herein by reference in their entirety.

TECHNICAL FIELD

The invention relates to product marketing, and more particularly, to techniques for locating local businesses to target for advertising products.

BACKGROUND ART

An issue with marketing a product is identifying target businesses to solicit to purchase the product. It is difficult to track which businesses within a particular area have already been solicited, particularly when multiple sales people are active in the same area. Without accurate record-keeping and coordination, many inefficiencies result, including duplicative contacts with some businesses and uneven coverage of some areas. In instances where businesses are unintentionally revisited, time and money is lost. In areas that are underserved by a sales force, valuable business opportunities and potential customers are lost. In some cases, a sales person may not be aware of particular unsolicited businesses in the local area. Thus, they may end up traveling more extensively than would be required to visit the unsolicited local businesses, which again results in the inefficient use of the sales force.

SUMMARY

One embodiment of the present invention provides a computer implemented methodology for identifying target businesses to solicit for purchase of advertising products. The present invention beneficially aids in the coordination of solicitation of businesses within a target area between various representatives in the target area. The method includes presenting a user with a digital map, receiving a request for business listings from the user, based on movement of the map to a target solicitation area, generating a list of business listings responsive to the request, and displaying the list to the user. Each listing can then be displayed on the map with a corresponding marker that indicates the listings availability for solicitation of advertising products. In one particular case, the digital map includes a centered crosshair, and the request is generated when the center of the map is shifted. Examples of shifting the center of the map may include panning, dragging, go-to action, or any other such map moving techniques. In another particular case, up to N business results are reflected on the map in a widening radius around the centered crosshair, where N in one embodiment is from 2 to 200. In another particular case, results of the request are bounded by a visible area of the map. In another particular case, when results of the request are returned to a requesting client of the user, a row with details for each business reflected in the results is displayed in a list proximate the map. In one such case, and in response to the user moving a cursor over a displayed marker, a label is displayed alongside that marker with the name of the business, and a scroll position of the list proximate the map is shifted so that the corresponding business appears in the center of the visible list. In another particular case, the markers are color-coded to indicate availability of the corresponding business for solicitation. In another particular case, clicking a marker will star the corresponding listing to indicate user interest in that business listing. In one such case, starred listings persist across multiple map searches. In another such case, a user can select to display starred listings in place of the business list. When starred listings are displayed, a control can also be displayed that allows the user to bulk-create pre-filled listing drafts for all starred businesses.

Another embodiment of the present invention provides one or more machine readable mediums encoded with instructions, that when executed by one or more processors, cause the processor to carry out a process for identifying target businesses to solicit for purchase of advertising products. Machine readable mediums may comprise one or more compact disks, diskettes, servers, memory sticks, or hard drives, etc. This process can be, for example, similar to or a variation of the previously described method.

Another embodiment of the present invention provides a system for identifying target businesses to solicit for purchase of advertising products. The system functionality such as that of the previously described method or a variation thereof can be implemented with a number of means, such as software which can comprise executable instructions encoded on one or more computer-readable mediums, hardware such as gate level logic or one or more ASICs, firmware such as one or more microcontrollers with I/O capability and embedded routines for carrying out the functionality described herein, or some combination thereof. The system can be implemented in a client-server environment, with some extrusion detection functionality carried out, for example, at the server and some at the client, or all at the client. The client can be configured as heavy or light as desired, as will be apparent in light of this disclosure.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Figure 1:
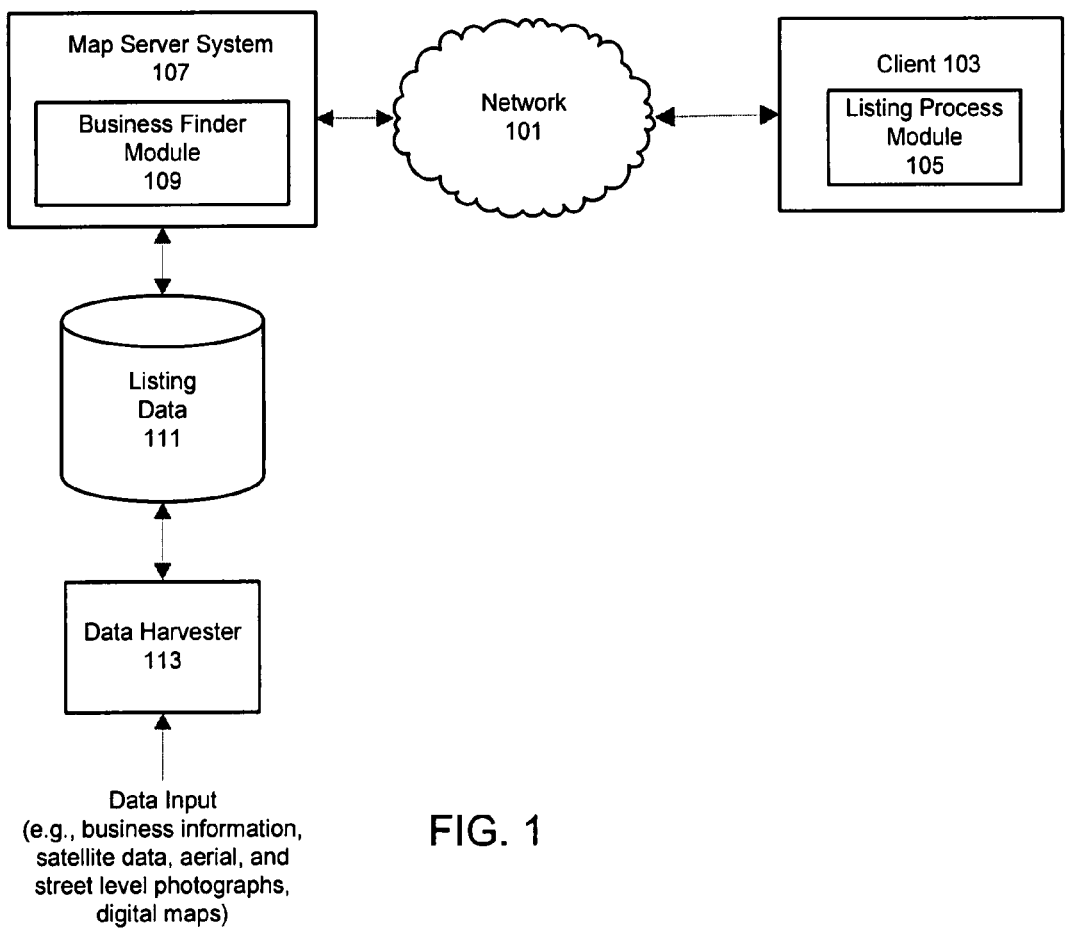
FIG. 1 illustrates a system configured for finding target businesses to solicit regarding a company's products, in accordance with an embodiment of the present invention.

Marketing techniques are disclosed that allow companies or their representatives selling advertising products to efficiently identify target businesses to solicit for purchase of those advertising products. The techniques include, for example, a map-based interface for selecting a neighborhood or other specific geographic area and locating businesses in that area, with the intent of allowing a user or company "representative" to select a set of those businesses to contact regarding the company's advertising products. The contact may include a visit to the target business to gather a rich set of data associated with that target business such as a photograph of the storefront, hours of operation, payment types accepted, and any notable specialties or unusual services. The contact may also be to solicit that target business for the purchase of advertising products such as GOOGLE ADWORDS or other online advertising product in the form of a highly customized mailer or other such marketing collateral that includes the rich collected data. The map displays business listings as markers on the map, with color-coding used to indicate listings the representative has already contacted, and listings that some other representative has contacted.

The rich data collected by the representatives can be used to augment or otherwise improve the business listing data display on various online search systems by entering that collected data into the database of such systems. Example search systems that can employ the techniques include GOOGLE search, GOOGLE LOCAL, GOOGLE MAPS, GOOGLE EARTH, and other GOOGLE search/map systems. Other search and/or map systems can also implement the techniques described herein, such as MICROSOFT, YAHOO!, MAPQUEST, AOL, and ASK.com search and/or map systems, as will be apparent in light of this disclosure. In addition, other non-search applications where effective marketing material is desirable can also employ the techniques. Non-search applications may include yellow-page ad products, on-line bulletin board ad products, and cross-selling ad products such as when a consumer is shopping for a particular item and receives ads directed to related items or simply other good/services that may be of interest to the user. As previously indicated, the collected data may include, for example, information such as hours of operation, payment types accepted, and storefront photos, popular menu items and/or specialties, pricing data, and other useful information about the business. Such data which can be used in addition to typical listing data such as business name, street address, and telephone number provides a richness that is currently missing from conventional online search/map system result displays. The representatives are free to cover their neighborhoods or other available target areas however they choose in their search for available listings of target businesses to augment in this fashion.

A potential issue with a free-form exploration approach is that giving a representative the task of talking to businesses in their neighborhood may result in scattershot, uneven coverage of the area. For instance, representatives may be more inclined to talk to businesses that they know and frequent, like restaurants and shops, and pass over businesses that they visit infrequently or not at all, like doctors, attorneys, accountants, auto repair shops, hobby shops and specialty stores, etc. The business finding techniques described herein can be used to avoid such issues and improve the business listing data and GOOGLE ADWORDS penetration or other such ad product for all businesses, not just the popular ones. This is accomplished by allowing a representative to get a broad view of the businesses that are available in a target area, using a digital maps-based approach such as GOOGLE MAPS, GOOGLE LOCAL, or other mapping system, such as a MICROSOFT VIRTUAL EARTH, MAPQUEST, or YAHOO! maps. By panning, dragging or otherwise directing the map to a new location, and in accordance with one embodiment of the present invention, the representative can locate target businesses in the visible bounds of the map, radiating out from the center point. Listings that the representative indicates interest in can be automatically saved as pre-filled 'draft' listing entries, allowing the representative to concentrate on collecting and entering the rich data that is above and beyond business name and address.

Another benefit provided by the business finding techniques described herein is a lightweight reservation system that helps give a representative a better sense of how well a targeted area has already been covered by other representatives. In accordance with one embodiment, representatives are not eligible to enter business listing data for businesses for which another representative has already submitted approved augmented data. In one such embodiment, a client-side listing process module 105 displays these unavailable listings on the map as well as those that may become potentially unavailable soon because of drafts that another representative has created, so that the inquiring representative can get a sense of whether his/her business visits in that area are likely to be productive or not. By marking an interest in available businesses, the representative can effectively designate his/her targeted areas and discourage other representatives from contacting those businesses.

Another benefit provided by the business finding techniques described herein is a heat area map indicating the current coverage in a certain area. This allows representatives to have an idea of what areas have been predominately covered and which areas still need to be visited.

In addition, filtering tools are provided that allow a representative to restrict the found businesses by a particular street or other discrete map area, with the intent that a representative would then have an additional tool for planning a door-to-door coverage route for his/her visits.

System Architecture

FIG. 1 illustrates a system 100 configured for finding target businesses to solicit regarding a company's products, in accordance with an embodiment of the present invention. The company's products may include, for example, online search-based advertising products such as GOOGLE ADWORDS pay-per-click ad product. However, other types of products can benefit from the system 100, as will be apparent in light of this disclosure. Further note that the system 100 can be used with online search-based advertising products other than GOOGLE's search systems such as MICROSOFT, YAHOO!, AOL, and ASK.com search systems. In a more general sense, the system 100 could be useful for any sort of entity or party that wants to view a set of businesses in a map-constrained area. The system 100 can be used, for example, by external sales-force based applications that are targeting businesses for product marketing.

As can be seen, the system 100 includes a map server system 107 that is communicatively coupled to one or more clients 103 via a network 101. A single client 103 is merely illustrated in order to simplify and clarify the present description, though in operation any number of clients 103 will be in communication with the map server system 107. Client 103 may be any type of device or system configured for computing, such as a personal computer or laptop, a mobile phone, a personal digital assistant, special purpose microcomputer, and so on. The client 103 includes a browser or any other suitable application that allows the user to interface and communicate with other devices and systems on the network 101. Examples of browsers include MICROSOFT INTERNET EXPLORER browser, NETSCAPE NAVIGATOR browser, MOZILLA FIREFOX browser, PALM SOURCE browser, or any other browsing or application software capable of communicating with network 101. Generally stated, the client 103 can be any device that allows a user to access the map server system 107 via the network 101. Other clients not shown may also be in communication with the map server system 107 via the network 101.

Each client 103 includes a listing process module 105. This module can be implemented in the client 103, for example, as a plug-in or other installed executable or a script file such as JAVASCRIPT or other suitable script language that is associated with a web page provided to the client 103 by the map server system 107. In accordance with one particular embodiment, the listing process module 105 operates to keep track of the query results and associated map objects. In more detail, a number of pieces of data are tracked in the user's browser using JAVASCRIPT which is one implementation of the listing process module 105. Here, the listing process module 105 tracks the set of listings that have been found by the map queries requested by a representative via a browser of a client 103. Each listing returned is tracked as a JAVASCRIPT Object Notation (JSON) object or other suitable data interchange format, stored in a master JavaScript array and indexed by an ID which is unique to each business listing. On receipt of listing data responsive to a query, the listing process module 105 annotates each listing with additional data relevant to the display, such as whether it is selected, what its calculated street name is, and what its display index is in the list of businesses. The listing process module 105 of this example embodiment also creates and references the map marker for that listing and the label overlay that will be displayed next to the listing when the curser is placed over the map marker or when the listing is selected from the menu displaying the businesses in the vicinity. Other variables keep track of the set of street names that the user can filter against, the filtering state, and the overall number of searches that the user has performed. Additional JAVASCRIPT controls display of informational messages for the user, such as indications that a search is underway, that a go-to ('fly to') location has been located, that no businesses were found for an area, etc, can also be provided.

The network 101 may be any type of communications network, such as a local area network such as an intranet, wide area network for example the internet, or some combination thereof. Alternatively, the network 101 may be a direct connection between the client 103 and the map server system 107. In general, the client 103, network 101, and/or map server system 107 may be in communication via any type of wired or wireless connection, using a wide variety of communication protocols.

The map server system 107 operates in conjunction with the business finder module 109, and can be implemented with conventional or custom technology. The map server system 107 may include one or more servers operating under a load balancing scheme, with each server or a combination of servers configured to carryout one or more functions required to answer client 103 requests via the network 101. In one particular embodiment, the map server system 107 is implemented with digital mapping system functionality as discussed in the U.S. application Ser. Nos. 11/051,534 and 11/088,542, which describe tile-based mapping systems. Note, however, that the business finder techniques discussed herein can also be used with other mapping systems, such as vector-based and raster-based mapping systems.

The business finder module 109 is for finding businesses that match the representative's map criteria. In one such embodiment, input to the business finder module 109 includes the north, south, east, and west bounds of the map, the map's current zoom level, the search count of this search so the client can associate the results with the appropriate search, and the offset from the start of search results to include in this set. Given this data, the business finder module 109 assembles an appropriate local XML query for results and gets an initial set of results from the listing data database 111. This API can limit the number of results per local query, if so desired for example to 20 per query. If the set of results is far too large to be reasonable such as more than 5 million, then the business finder module 109 informs the user via the listing process module 105 that they must zoom in to see the listings. If the expected total size returned in the set of results is more than adequate for displaying a listing cap (e.g., listing cap of 200), then the server-side business finder module 109 loops to retrieve the next sets of results repeatedly until 200 listings or any other desired listing cap are retrieved. If not, the business finder module 109 sends via the map server system 107 the initial 20 results back to the client 103, and the client 103 loops back to make subsequent server queries until it runs out of results for the area or hits the listing cap of 200, for example.

The map server system 107, which includes a business finder module 109, is also in communication with a listing data database 111 that includes listing data associated with businesses such as business names, address, telephone number, storefront photographs, hours of operation, accepted payment types, etc. The listing data database 111 can be any type of computer-readable media such as a hard drive or any other tangible data storage device.

The listing data database 111 can be populated, for example, offline, or in real-time. As previously explained, business listing data can be uploaded or otherwise provided by a "representative" that has personally visited a business and photographed its storefront, and includes data such as the business name, street address, telephone number, storefront photographs, hours of operation, accepted payment types, popular menu items and/or specialties, pricing data, and other useful information about the business.

A data harvester 113 is in communication with the listing data database 111 and can be used to automatically seek and collect business data from online sources such as yellow page listings and/or storefront image databases indexed by street address included in the geographic area covered by the system 100. The data acquired by the data harvester 113 may also include other data such as map data and satellite images. The harvesting can be accomplished by any number of techniques including the use of web crawlers. The business data collected by the data harvester 113 is stored in the listing data database 111 once the appropriate data has been collected.

Note that other modules may be included in the system 100, and that illustrated modules may be rearranged. For instance, the data harvester 113 can be integrated into the map server system 107. Similarly, the business finder module 109 may be a stand alone module or server opposed to being integrated with the map server system. Other configurations will be apparent in light of this disclosure, and the present invention is not intended to be limited to any particular one.

User Interface

Figure 2:
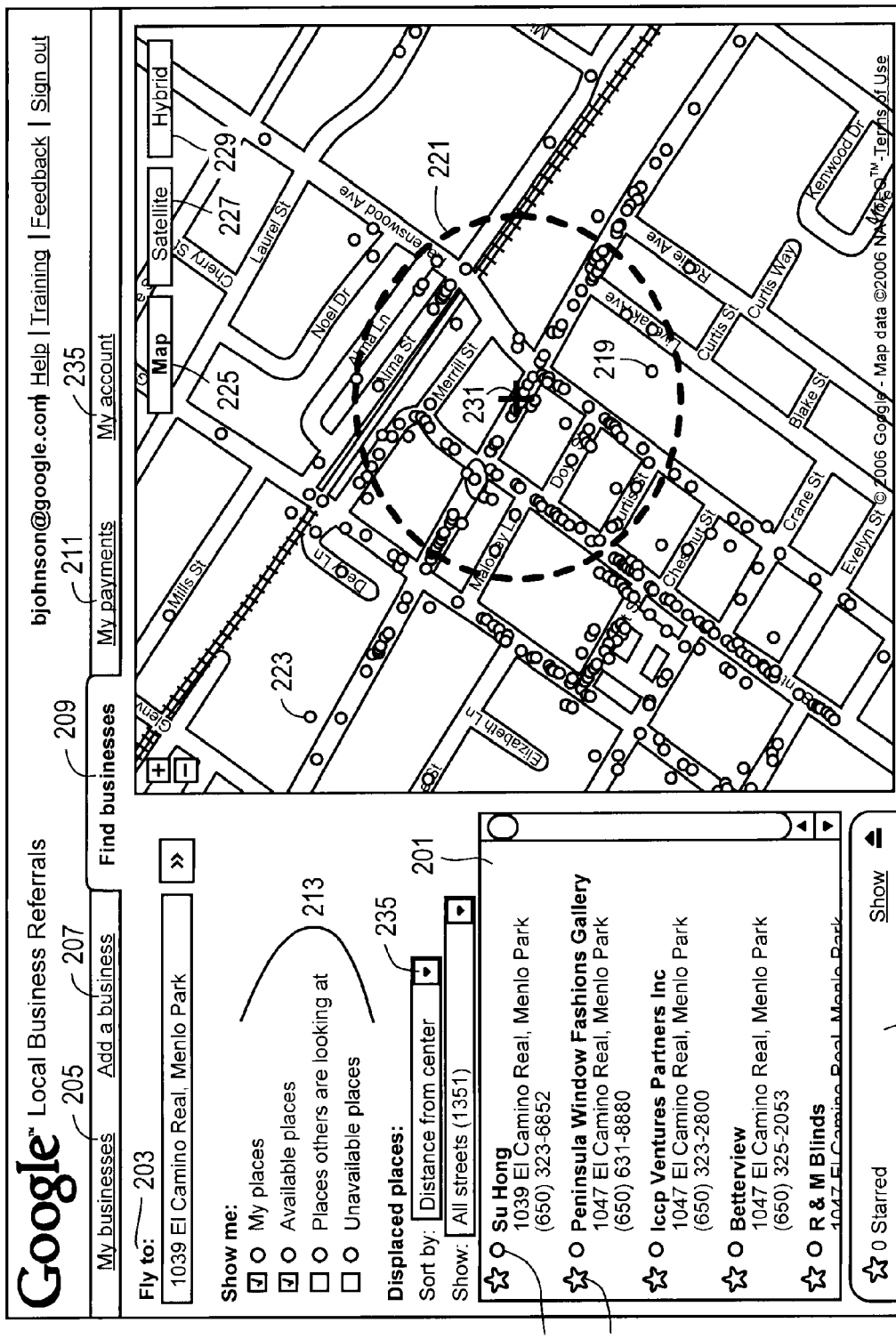
FIG. 2 illustrates a user interface of the system shown in FIG. 1 and example search results, in accordance with an embodiment of the present invention.

FIG. 2 illustrates a user interface of the system 100 shown in FIG. 1 and example search results, in accordance with an embodiment of the present invention. In one particular embodiment, the listing process module 105 includes or otherwise works in conjunction with a go-to (referred to as 'fly to' herein) location controller. This 'fly to' location controller allows the user to geocode an arbitrary address into the 'fly to' dialog box 203. For example "1039 El Camino Real, Menlo Park" was entered into the dialog box 203. Responsive to receiving the address in the 'fly to' dialog box 203, the location controller will center the map on the location specified by the representative which in this example is a business Su Hong. In one such embodiment, this feature is implemented as an AJAX call to the map server system 107, which contacts a geocoding service included in or otherwise accessible to the map server system 107 to determine whether enough information has been given to establish a latitude and longitude for the location. If a location is returned, the listing process module 105 (e.g., result handling JavaScript) automatically centers the map on the new location which is designated by a crosshair 231 and begins a query.

The listing map that is displayed by default as a result of the query can be, for example, an animated map as shown in FIG. 2. In one such case, the map can be interacted with using public GOOGLE MAPS v2 APIs (e.g., reference at http://www.google.com/apis/maps/documentation). In another embodiment the listing map that is displayed can be a satellite image of the area provided by GOOGLE EARTH or any other mapping application by selecting the satellite button 227. In another embodiment the listing map that is displayed can be a hybrid of the satellite image and the map shown in FIG. 2. This can be accomplished by selecting the hybrid button 229. The various maps can be displayed by selecting buttons 225, 227 and 229 depending on the preference of the user.

The displayed map has event hooks attached so that starting a drag will move the crosshair 231 to a new location and will halt any current searches, and ending a drag will initiate a search for the new location once the location of the crosshair 231 is established. The listings that have been found on the map are displayed as small color coded dots 223 and 219 which represent a custom GOOGLE marker in the example embodiment shown in FIG. 2. The specific color of the dots is an indication of the status of the associated business. For example blue dots are listings that belong to the representative, green dots are available, orange dots are listings being looked at by other representatives, and red dots are listings that belong to other representatives. The markers beneficially aid representatives in the coordination of which businesses to solicit based on their availability, thus preventing overlapping coverage. The user has the ability to filter what types of listings are displayed on the map via the Show Me menu 213. In FIG. 2, "My Places" represented by a blue dot and "Available Places" represented by a green dot have been selected. The map indicates that no businesses belonging to the representative are within the given location due to the lack of blue dots on the map. However, the map indicates through green dots the available businesses to solicit around 1039 El Camino Real, Menlo Park in the example. The Show Me menu 213 allows the representative to view the current coverage of a particular area in the map.

In another particular embodiment, moving the cursor over these markers will display a label indicating business listing information alongside the dot with the name of the business (e.g., a custom GOOGLE overlay) and shift the scroll position of the business list 201 further described below so that the given business appears in the center of the visible list 201 designated by the crosshair 223. Clicking the marker 223 or 219 will star 217 that listing indicating potential interest in that location. In another particular embodiment, the set of listings that a representative has starred 233 is maintained separately from the list of found businesses 201 so that the starred listings 233 persist across multiple map searches. The number of starred listings 233 is tracked and displayed in an expandable tab below the list of businesses, as shown in FIG. 2. Clicking on this tab will display the starred listings 233 in place of the business list 201. When displayed, a control will also appear that allows the representative to bulk-create pre-filled listing drafts for all starred businesses. These drafts will be filled with the listing's business name, address information, phone number, ID, and latitude/longitude coordinates.

Other tabs, such as My businesses 205, Add a business 207, My payments 211, and My account 235 can also be provided, as shown in FIG. 2, so that the representative can better manage their solicitation tasks and monitor progress based on income generated as indicated in the My payments section 211, and acquired listings as indicated in the My businesses section 205. The Add a business section 207 allows the representative to enter a listing for evaluation by the business matcher system 100 as described herein, and the My account section 235 provides the representative with an overview of information associated with the account such as user preferences.

In another embodiment the listing map can be a heat map indicating the level of coverage in particular areas. For example in one embodiment highly covered areas can be designated red to indicate the majority of businesses have already been visited, orange can represent areas with moderate coverage and green indicates areas with little to no representative coverage. This feature can assist representatives in identifying which areas have been predominately covered and which areas still need to be visited.

In addition to displaying the map which includes the location of businesses represented by a color coded marker, a list of businesses 201 is displayed. The businesses within the list 201 are representative of in one embodiment at most two hundred businesses located within the target range defined by the dashed circle 221 indicating the boundary of the displayed list of businesses 201. The list of businesses 201 that have been found for the given area in response to a query can be implemented, for example, as an IFrame whose contents are populated using DHTML (dynamic HTML). The contents of the IFrame are initially blank. When a set of listings are returned by a query, the IFrame contents are created or updated to display these listings. In one such embodiment, a client-side function either included in the listing process module 105 or in an independent module is provided that converts an annotated JSON listing into the row HTML appropriate to that listing; each row is tagged with an ID so that it can be replaced as the listing's status is updated. In more detail, each row in the list 201 displays the color-coded dot 215 for that business indicating its availability to be contacted, the name, address, and phone number for the business, and a star 217 for indicating interest in that business. The list of businesses can be sorted, for example, by distance from the map center point, business name, street name, or availability status through an options pull-down menu 235. It can also be filtered by street name where the street name list is dynamically populated based on the search results and availability in the options pull-down menu 235. The rows can also have some additional JavaScript functionality attached to them. For instance, moving the cursor over a row will highlight that row and display the listing's label in the appropriate place on the map. Clicking on a row will toggle the row's selection status by selecting to star 217 that particular business if it is currently available. Likewise, sorting or filtering the listings can be entirely accomplished on the client 103, using JavaScript sort comparators and display filters.

Querying against the listing data database 111 for a duplicate for every listing processed could be prohibitively expensive, so one embodiment of the business finder system 100 uses a probabilistic duplicate detection algorithm included in the business finder module 109 to find others' listings, which determines the ultimate availability of a listing to be contacted by the current representative. In one such embodiment, the duplicate detector uses a Bloom filter to store the IDs of all listings that are either unavailable and have passed through the approval process or are currently being looked at indicating the listing has been submitted for approval or recently drafted. This filter can be, for example, populated at server start-up time and intended to be re-calculated every ten minutes. The representative's existing listings within the bounds of the map are overlaid over this set to indicate listings that already belong to the representative. With this data set up, the business search code of the business finder module 109 can quickly iterate through the list of returned listings and determine their availability appropriately.

In general, when a representative enters a business listing request via a map-based interface executing in conjunction with the representative's browser and client-side listing process module 105, it is put into a request by the client 103, and sent to the map server system 107 via the network 101. The map server system 107 then determines what is requested, engages the business finder module 109 to generate a list of business listings responsive to the query, and responds with those business listings. As previously explained, the business finder module 109 uses map data included in the user's request to identify corresponding business listing data included in the representative's current map view located in the listing data database 111. In more detail, and in accordance with one embodiment of the present invention, the representative is presented with a digital map with a centered crosshair. When the center of the map is shifted, a query is initiated to populate up to 200 business results in a widening radius around the point under the crosshair. Shifting of the center of the map can be accomplished by flying to a location or dragging the map or panning the map. The results of the query are bounded by the visible area of the map. When the results of the query are returned, a small color-coded dot is placed on the map at the location for each business, and a row with details of the business is displayed in the business list.

Users of the clients 103 in this example are referred to as representatives, as they can provide data to the business listing data database 111 and/or trigger the automatic development of marketing collateral intended to help sell advertising products to the corresponding businesses reflected in that listing data database 111. The customization aspect of the generated marketing collateral will help ensure that the response rate of targeted businesses is high enough to sustain the company selling the ad products, as well as the representative (who can be compensated by the company for providing valuable business listing data). As will be appreciated in light of this disclosure, different designs and layouts of a collateral piece can be explored and otherwise tested for effectiveness. For instance, the company can keep track of which variant of collateral is sent to each business, so that the relative effectiveness of different designs can be tracked.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computer-implemented method for identifying businesses to solicit for purchase of online advertising from an advertising system, the method comprising:
   transmitting a digital map for display on a client device of a user, the digital map displaying a first area;
   receiving at a computer an indication of a user input on the client device to move the area displayed in the digital map from the first area to a second area;
   generating a list of businesses located in a geographic region associated with the second area of the digital map;
   determining, for each business included in the list, whether the business is eligible to receive a customized marketing collateral for soliciting the business to advertise online with the advertising system, the customized marketing collateral including one or more images of the business and associated business data; and
   transmitting the list of businesses to the client device of the user, each business being presented on the digital map by a corresponding marker at a location on the digital map corresponding to an address of the business, and wherein the marker indicates the business' eligibility to receive the marketing collateral.

2. The method of claim 1 wherein the digital map includes a centered crosshair, and a request for the list of businesses is generated responsive to the centered crosshair being shifted on the digital map.

3. The method of claim 2 wherein up to N business listings are displayed on the digital map in a widening radius around the centered crosshair, where N is from 2 to 200.

4. The method of claim 2 wherein shifting the centered crosshair on the digital map to a third area halts any current search and ending the shift initiates a new search for businesses associated with the third area once a location of the crosshair is established.

5. The method of claim 1 wherein the list of businesses is generated responsive to a request for the list from the client device and locations of the businesses in the list are displayed within a visible area of the digital map.

6. The method of claim 1 wherein the list of businesses transmitted to the client device of the user comprises details for each business in a list proximate to the digital map.

7. The method of claim 6, wherein a label is displayed alongside the marker with a name of the business responsive to a user input moving a cursor over the marker; and wherein adjusting a scroll position of the list proximate to the map causes the display of the corresponding business in the center of the list.

8. The method of claim 1 wherein the markers are color-coded to indicate eligibility to receive marketing collateral from the user.

9. The method of claim 1 wherein at least one of the markers visually indicates businesses that have already been contacted by a solicitor and are no longer eligible to receive marketing collateral from the user.

10. The method of claim 1 wherein user selection of the marker indicates user interest in the business corresponding to the marker.

11. The method of claim 1 wherein the digital map is a satellite image or an animated image.

12. The method of claim 1 wherein the digital map is a heat map indicating a level of coverage within a target area.

13. A computer-implemented method for identifying businesses on a digital map to solicit for purchase of online advertising from an advertising system, the method comprising:
   transmitting the digital map for display on a client device of a user, the digital map displaying a first area and wherein the digital map is a satellite image or animated image or a hybrid of the satellite image and the animated image;

receiving at a computer an indication of a user input on the client device moving a centered crosshair displayed on the digital map from the first area to a second area;

generating a list of businesses located in a geographic region associated with the second area of the digital map and wherein the businesses in the list are located in the geographic region within a boundary defined by the centered crosshair;

determining, for each business included in the list, whether the business is eligible to receive a customized marketing collateral for soliciting the businesses to advertise online with the advertising system, the customized marketing collateral including one or more images of the business and associated business data; and transmitting the list of businesses to the client device of the user, wherein each business is presented on the digital map by a corresponding color-coded marker at a location on the digital map corresponding to an address of the business, and wherein the marker indicates the business' eligibility to receive customized marketing collateral, and wherein the list of businesses comprise details for each business.

14. A computer program product, comprising a non-transitory computer readable-storage medium storing computer executable instructions for controlling a processor to perform the operations of:

transmitting a digital map for display on a client device of a user, the digital map displaying a first area;

receiving an indication of a user input on the client device to move the area displayed in the digital map from the first area to a second area;

generating a list of businesses located in a geographic region associated with the second area of the digital map;

determining, for each business included in the list, whether the business is eligible to receive a customized marketing collateral for soliciting the businesses to advertise online with the advertising system, the customized marketing collateral including one or more images of the business and associated business data; and transmitting the list of businesses to the client device of the user, each business being presented on the digital map by a corresponding marker at a location on the digital map corresponding to an address of the business, and wherein the marker indicates the business' eligibility to receive the marketing collateral.

15. The computer program product of claim 14 wherein the digital map includes a centered crosshair and a request for the list of businesses is generated responsive to the centered crosshair being shifted on the digital map.

16. The computer program product of claim 15 wherein up to N business listings are displayed on the digital map in a widening radius around the centered crosshair, where N is from 2 to 200.

17. The computer program product of claim 15 wherein shifting the centered crosshair on the digital map to a third area halts any current search and ending the shift initiates a new search for businesses associated with the third area once a location of the crosshair is established.

18. The computer program product of claim 14 wherein the list of businesses is generated responsive to a request for the list from the client device and locations of the businesses in the list are displayed within a visible area of the digital map.

19. The computer program product of claim 14 wherein the list of businesses transmitted to the client device of the user comprises details for each business in the list proximate to the digital map.

20. The computer program product of claim 19, further wherein a label is displayed alongside the marker with a name of the business responsive to a user input moving a cursor over the marker; and wherein adjusting a scroll position of the list proximate to the map causes the display of the corresponding business in the center of the list.

21. The computer program product of claim 14 wherein the markers are color-coded to indicate eligibility to receive marketing collateral from the user.

22. The computer program product of claim 14 wherein at least one of the markers visually indicates businesses that have already been contacted by a solicitor and are no longer eligible to receive marketing collateral from the user.

23. The computer program product of claim 14 wherein user selection of the marker indicates user interest in the business corresponding to the marker.

24. The computer program product of claim 14 wherein the digital map is a satellite image or an animated image.

25. The computer program product of claim 14 wherein the digital map is a heat map indicating the level of coverage within the target area.

* * * * *